United States Patent
Kurokawa

(10) Patent No.: US 9,377,621 B2
(45) Date of Patent: Jun. 28, 2016

(54) LIGHT SCANNING APPARATUS AND IMAGE FORMING APPARATUS USING THE SAME

(71) Applicant: CANON KABUSHIKI KAISHA, Tokyo (JP)

(72) Inventor: Shuichi Kurokawa, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/886,208

(22) Filed: Oct. 19, 2015

(65) Prior Publication Data

US 2016/0124219 A1  May 5, 2016

(30) Foreign Application Priority Data

Oct. 29, 2014  (JP) .................................. 2014-220164

(51) Int. Cl.
| | |
|---|---|
| *G03G 15/04* | (2006.01) |
| *G02B 26/12* | (2006.01) |
| *G03G 15/043* | (2006.01) |

(52) U.S. Cl.
CPC ............ *G02B 26/125* (2013.01); *G02B 26/123* (2013.01); *G03G 15/043* (2013.01)

(58) Field of Classification Search
CPC .......... G03G 15/043; G03G 15/04072; G03G 15/04; G02B 26/123; G02B 26/125; G02B 26/124

See application file for complete search history.

(56) References Cited

U.S. PATENT DOCUMENTS

| | | | |
|---|---|---|---|
| 7,072,087 B2 | 7/2006 | Nakahata | |
| 7,791,632 B2 * | 9/2010 | Igarashi | ............... G02B 26/123 347/241 |
| 2006/0023283 A1 * | 2/2006 | Morimoto | ............ G02B 26/126 359/205.1 |
| 2008/0298839 A1 * | 12/2008 | Tomioka | ............ G02B 27/0018 399/151 |
| 2009/0278907 A1 | 11/2009 | Igarashi | |
| 2015/0205097 A1 * | 7/2015 | Kudo | ................... G03G 15/043 347/118 |

FOREIGN PATENT DOCUMENTS

| | | |
|---|---|---|
| JP | 2005004050 A | 1/2005 |
| JP | 2009271353 A | 11/2009 |
| JP | 2009271384 A | 11/2009 |

* cited by examiner

*Primary Examiner* — Francis Gray
(74) *Attorney, Agent, or Firm* — Rossi, Kimms & McDowell LLP

(57) ABSTRACT

The light scanning apparatus includes: a deflection element including first and second deflection surfaces; a rotor including a top surface facing the deflection element; a first imaging optical system including a first imaging lens; a second imaging optical system including a second imaging lens arranged to face first imaging lens; first and second shielding members. The first shielding member is arranged at a position where an edge portion thereof on a side closer to top surface in a sub-scanning direction blocks light reflected by first imaging lens. The second shielding member is arranged at a position where an edge portion thereof on a side closer to top surface in sub-scanning direction blocks light that has passed by first shielding member and been reflected by top surface.

12 Claims, 7 Drawing Sheets

LIGHT SCANNING APPARATUS AND IMAGE FORMING APPARATUS USING THE SAME

BACKGROUND OF THE INVENTION

1. Field of the Invention

The present invention relates to a light scanning apparatus and an image forming apparatus using the same. The present invention is suited to an image forming apparatus using an electrophotographic process, such as a laser beam printer, a digital copying machine, and a multifunction printer.

2. Description of the Related Art

In a known light scanning apparatus, a plurality of light beams emitted from light sources arranged for a plurality of respective colors are deflected by a single rotating polygon mirror, and different photosensitive drums are exposed and scanned using a plurality of imaging optical systems arranged corresponding to the respective light beams.

In such a light scanning apparatus, flare light, which is stray light reflected (scattered) by the surface of an imaging lens and the like included in the imaging optical system during exposure and scanning of the photosensitive drum corresponding to a given color, causes the following problem. Specifically, the flare light may enter the imaging optical system corresponding to a different color, and expose and scan the photosensitive drum corresponding to a color different from the color intended to be exposed and scanned, leading to image defects such as streaks and density unevenness.

The flare light can be suppressed by depositing an antireflection film on the imaging lens. In recent years, however, plastic molded lenses are widely used in order to reduce the weight and the cost of the light scanning apparatus, and hence it is difficult to deposit the antireflection film on a plastic molded lens.

In view of this, in Japanese Patent Application Laid-Open No. 2005-004050, a shielding member configured to shield flare light is arranged in a housing in order to prevent the flare light from reaching a photosensitive drum. However, when the imaging lens or the like is assembled in a position different from a desired position, the optical path of the flare light changes, and hence the flare light may pass by the shielding member. In order to prevent this, the size of the opening portion of the shielding member needs to be reduced as much as possible. However, in this case, the actual light beam that is intended to expose and scan the photosensitive drum may be shielded as well.

Further, in Japanese Patent Application Laid-Open No. 2009-271353, an opening portion of a shielding member is made as narrow as possible by arranging a drive substrate of a motor configured to rotate a rotating polygon mirror in an asymmetric manner in the direction of an optical axis of an imaging lens, and bringing the shielding member as close as possible to the drive substrate. However, the shielding member is close to the drive substrate of the motor, which is a heat source, and hence the shielding member is deformed or displaced in a similar manner to the thermal deformation undergone by the housing, which allows flare light to pass by the shielding member and reach a photosensitive drum. As a result, an image defect is produced. Further, because the shielding member is close to the rotating polygon mirror that is rotating at high speed, unwanted sound, such as wind noise, is a problem.

In this case, when optical components, such as the rotating polygon mirror serving as a deflection element and the imaging lenses, are arranged close together in order to reduce the size of the light scanning apparatus, flare light reflected by the surface of the imaging lenses and the like is again reflected by the top surface (upper surface) of a rotor forming a part of the motor rotatably holding the rotating polygon mirror. The optical path of such flare light (a rotor reflection flare) changes as a result of being reflected by the top surface of the rotor, and moves closer to the actual beam, and thus it is difficult to shield the flare light.

Regarding such a rotor reflection flare, in Japanese Patent Application Laid-Open No. 2009-271384, a gap between the rotor top surface and the rotating polygon mirror lower surface is appropriately set based on the arrangement of the optical components in order to separate the actual light beam and the rotor reflection flare, thereby allowing the rotor reflection flare to be shielded by the shielding member.

In this case, unlike the imaging lenses and the like, the deflection element and the rotor are usually components that can be easily shared by different light scanning apparatus, and hence generally the same deflection element and rotor are used even if the optical specifications are different. However, when those components are shared, optimization of each light scanning apparatus is not always carried out from the perspective of shielding flare light, and hence attempting to optimize each light scanning apparatus can lead to cost increases.

SUMMARY OF THE INVENTION

It is an object of the present invention to provide a light scanning apparatus that is compact and is capable of suppressing the effects of flare light on an image without increasing costs when attempting to optimize each light scanning apparatus, and an image forming apparatus using such a light scanning apparatus.

In order to achieve the above-mentioned object, according to one embodiment of the present invention, there is provided a light scanning apparatus, including: a deflection element including a first deflection surface for deflecting a light beam from a first light source and a second deflection surface for deflecting a light beam from a second light source; a rotor including a top surface facing the deflection element, the rotor being configured to rotatably hold the deflection element; a first imaging optical system including a first imaging lens, the first imaging optical system being configured to guide a light beam from the first deflection surface to a first scanned surface; a second imaging optical system including a second imaging lens arranged to face the first imaging lens so as to sandwich the deflection element, the second imaging optical system being configured to guide a light beam from the second deflection surface to a second scanned surface; a first shielding member arranged in an optical path of the first imaging optical system; and a second shielding member arranged in an optical path of the second imaging optical system, in which the following conditional expression is satisfied:

$$H - \frac{(H - L\tan\beta)\left(S + \frac{D}{2}\right)}{P + \frac{D}{2}} < A < H - \frac{(H - L\tan\beta)\left(S - \frac{D}{2}\right)}{P - \frac{D}{2}}$$

where A represents a distance from a reference plane to an edge portion of the first shielding member in a sub-scanning direction on a side closer to the top surface, the reference plane including a center of the first deflection surface in the sub-scanning direction and being parallel to a main scanning cross-section, H represents a distance from the reference plane to the top surface, L represents a distance from a deflection point of the light beam at the first deflection surface to the first imaging lens, P represents a distance from an axis of rotation of the deflection element to the first imaging lens, S represents a distance from the axis of rotation to the first shielding member, D represents a diameter of the top surface, and p represents an angle of incidence of the light beam from the first light source with respect to the first deflection surface in a sub-scanning cross-section.

Further, according to another embodiment of the present invention, there is provided a light scanning apparatus, including: a deflection element including a first deflection surface for deflecting a light beam from a first light source and a second deflection surface for deflecting a light beam from a second light source; a rotor including a top surface facing the deflection element, the rotor being configured to rotatably hold the deflection element; a first imaging optical system including a first imaging lens, the first imaging optical system being configured to guide a light beam from the first deflection surface to a first scanned surface; a second imaging optical system including a second imaging lens arranged to face the first imaging lens so as to sandwich the deflection element, the second imaging optical system being configured to guide a light beam from the second deflection surface to a second scanned surface; a first shielding member arranged in an optical path of the first imaging optical system; and a second shielding member arranged in an optical path of the second imaging optical system, the first shielding member being arranged at a position at which an edge portion of the first shielding member on a side closer to the top surface in a sub-scanning direction blocks light reflected by the first imaging lens, the second shielding member being arranged at a position at which an edge portion of the second shielding member on a side closer to the top surface in the sub-scanning direction blocks light that has passed by the first shielding member and been reflected by the top surface.

Further, according to one embodiment of the present invention, there is provided an image forming apparatus, including the above-mentioned light scanning apparatus.

Further features of the present invention will become apparent from the following description of exemplary embodiments with reference to the attached drawings.

DESCRIPTION OF THE EMBODIMENTS

Exemplary embodiments of the present invention are hereinafter described in detail with reference to the attached drawings.

First Embodiment

Image Forming Apparatus

Figure 9:
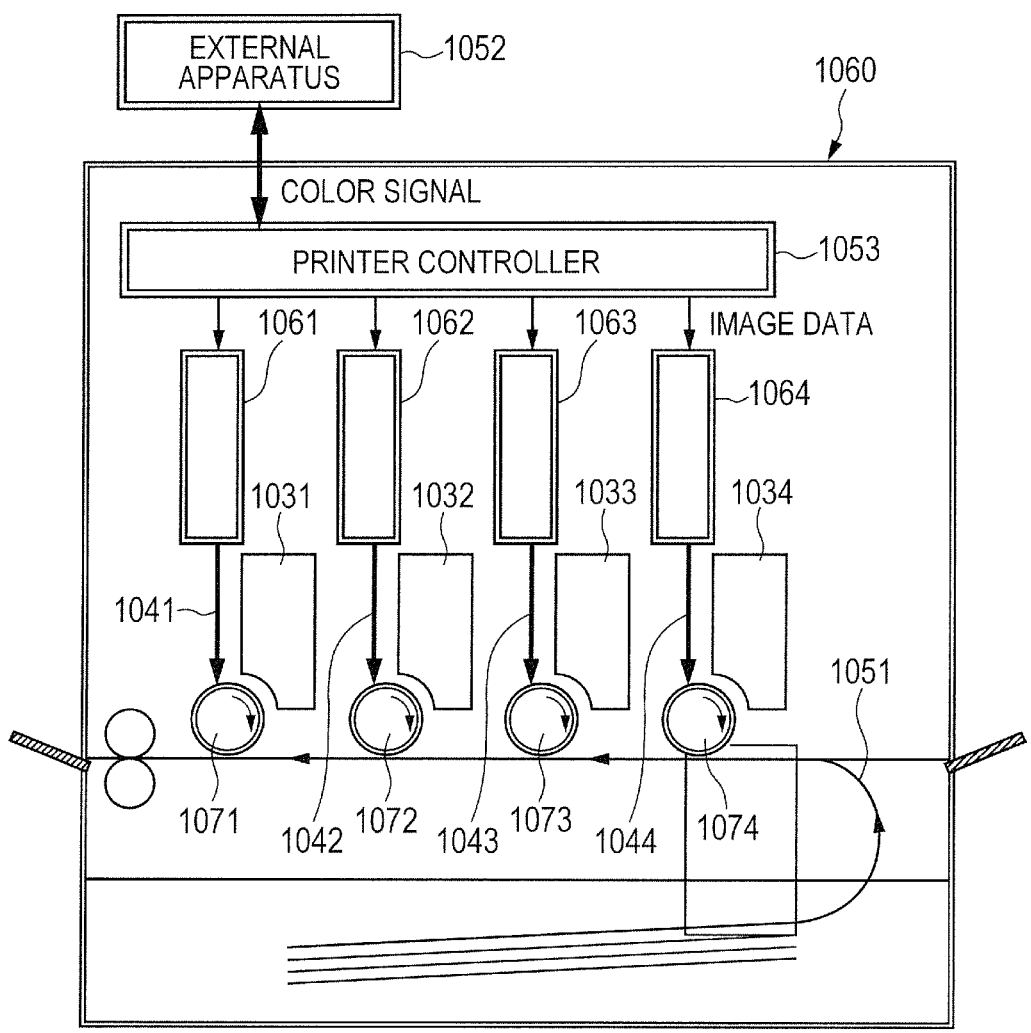
FIG. 9 is a diagram for illustrating an image forming apparatus including a light scanning apparatus according to an embodiment of the present invention.

FIG. 9 is a schematic diagram for illustrating the main parts of a color image forming apparatus serving as an example of an image forming apparatus including a light scanning apparatus according to an embodiment of the present invention. As described in more detail below, the light scanning apparatus in the color image forming apparatus includes a plurality of scanning optical systems (for convenience, denoted by reference numerals 1061, 1062, 1063, and 1064), each of the scanning optical systems being configured to form an optical path for scanning light on the surface of one of a plurality of photosensitive drums, which are image bearing members, with one deflection element (deflection unit).

In FIG. 9, a color image forming apparatus 1060 includes the scanning optical systems 1061, 1062, 1063, and 1064, photosensitive drums 1071, 1072, 1073, and 1074, each of which serves as an image bearing member (a photosensitive body), developing units 1031, 1032, 1033, and 1034, and a conveying belt 1051. Note that, the color image forming apparatus also includes a transferring unit (not shown) configured to transfer a toner image developed by a developing unit onto a transfer material and a fixing unit (not shown) configured to fix the transferred toner image on the transfer material.

In FIG. 9, red (R), green (G), and blue (B) color signals are input from an external apparatus 1052, such as a personal computer, to the color image forming apparatus 1060. Those color signals, which are code data, are converted by a printer controller 1053 in the apparatus into cyan (C), magenta (M), yellow (Y), and black (K) image signals (dot data). The converted image data is input to the corresponding scanning optical system 1061, 1062, 1063, or 1064.

Light beams 1041, 1042, 1043, and 1044 that have been modulated based on the corresponding image data are emitted from the scanning optical systems (the systems are described in more detail below). Photosensitive surfaces of the photosensitive drums 1071, 1072, 1073, and 1074 are scanned in a main scanning direction by the light beams. The optical paths of the light beams before (immediately before) the light beams enter the corresponding photosensitive drums 1071, 1072, 1073, and 1074 are parallel to each other. The light beams 1041, 1042, 1043, and 1044 correspond to cyan (C), magenta (M), yellow (Y), and black (K), respectively.

The color image forming apparatus according to this embodiment is configured to form an electrostatic latent image in each color on the surface of the corresponding photosensitive drum using a light beam based on the corresponding image data with the four scanning optical systems 1061, 1062, 1063, and 1064 in the manner described above, and to then form a one page full color image by transferring each of the formed electrostatic latent images onto a recording material in turn.

The external apparatus 1052 may be, for example, a color image reading apparatus including a CCD sensor. In this case, a color digital copying machine may be configured from the color image reading apparatus and the color image forming apparatus 1060.

(Light Scanning Apparatus Including a Plurality of Scanning Optical Systems)

Figure 1:
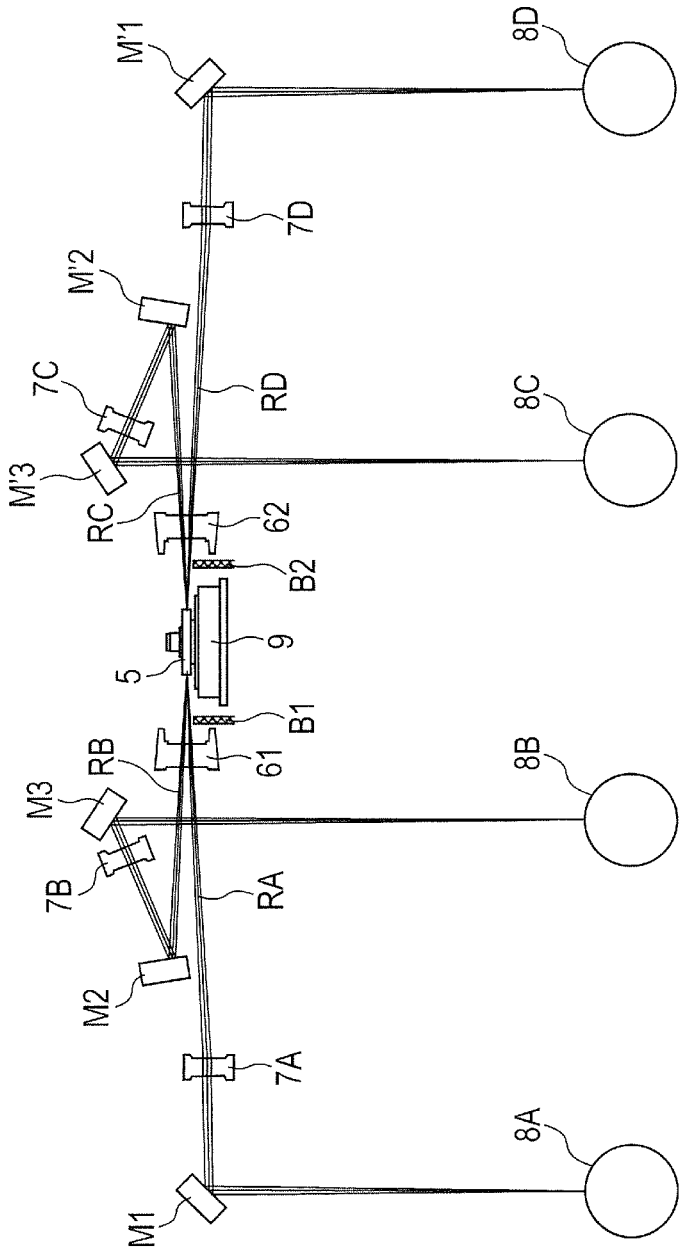
FIG. 1 is a sub-scanning cross-sectional view of a light scanning apparatus according to a first embodiment of the present invention.

FIG. 1 is a cross-sectional view of the main parts in a sub-scanning direction (sub-scanning cross-sectional view) of the light scanning apparatus according to the first embodiment of the present invention. In this embodiment, each scanning optical system corresponds to one color, cyan (C), magenta (M), yellow (Y), or black (K). Further, each scanning optical system includes a deflection element (deflection unit) common to all of the colors, and an imaging optical system for the corresponding color. Thus, the light scanning apparatus according to this embodiment includes a single deflection element (deflection unit).

Note that, in the following description, the main scanning direction is the direction perpendicular to the axis of rotation of the deflection unit and to the optical axis of the imaging optical system, namely, the direction in which the light beam is deflected and scanned by the deflection unit, and the sub-scanning direction is the direction parallel to the axis of rotation of the deflection unit. Further, the main scanning cross-section is the cross-section which passes through (includes) the center of the reflection surface of the deflection unit in the sub-scanning direction, and which includes the main scanning direction. The sub-scanning cross-section is the cross-section that includes the optical axis of the imaging optical system and is perpendicular to the main scanning cross-section.

Figure 2:
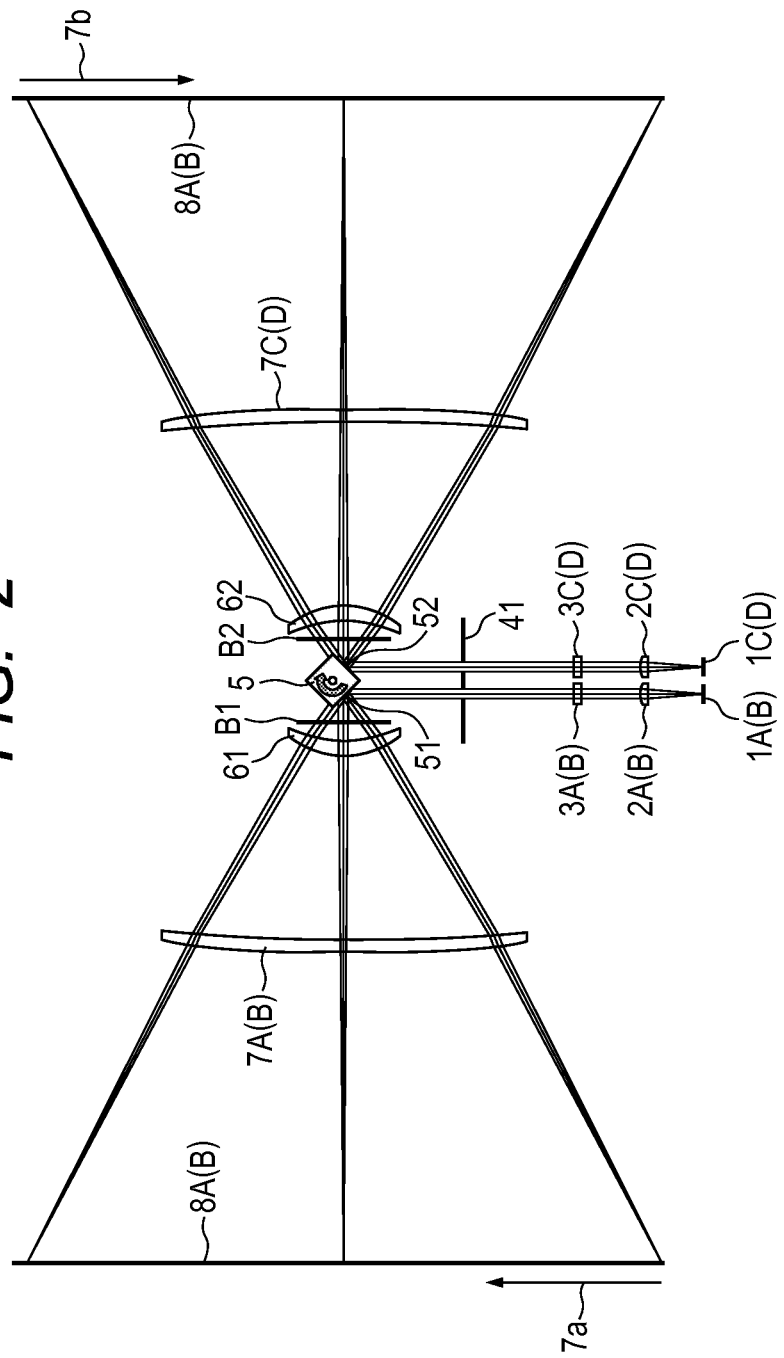
FIG. 2 is a main scanning cross-sectional view of the light scanning apparatus according to the first embodiment.

FIG. 2 is a cross-sectional view of the main parts in the main scanning direction (main scanning cross-sectional view) of the light scanning apparatus according to the first embodiment. However, in FIG. 2, the reflection of the optical path by reflection mirrors M1, M2, M3, M'1, M'2, and M'3 illustrated in FIG. 1 is enlarged, and the reflection mirrors themselves are omitted. In FIG. 2, the light beams emitted from light source units 1A and 1B are converted by coupling lenses 2A and 2B into substantially parallel light beams. Those light beams then enter cylindrical lenses 3A and 3B, and are refracted in only the sub-scanning direction. As a result, the light beams are focused near a first reflection surface 51 of a rotating polygon mirror 5, which serves as the deflection element (deflection unit), in only the sub-scanning direction, to thereby form an image as a long line in the main scanning direction.

The light beams emitted from the light source units 1A and 1B obliquely enter at a predetermined angle in the sub-scanning direction (in this embodiment, 3° above and below in the sub-scanning direction, respectively) with respect to the normal of the first reflection surface 51 (sub-scanning oblique incidence system). In other words, the light beams emitted from the light source units 1A and 1B obliquely enter symmetrically in the vertical direction with respect to a reference plane that passes through the center of the first reflection surface 51, which serves as a first deflection surface, in the sub-scanning direction and is parallel to the main scanning cross-section.

Similarly, the light beams emitted from light source units 1C and 1D are converted by coupling lenses 2C and 2D into substantially parallel light beams, and are then refracted by cylindrical lenses 3C and 3D in only the sub-scanning direction. Further, the light beams are focused near a second reflection surface 52, which is a different surface from the first reflection surface 51, in only the sub-scanning direction, to thereby form an image as a long line in the main scanning direction.

The light beams emitted from the light source units 1C and 1D obliquely enter at a predetermined angle (in this embodiment, 3° above and below in the sub-scanning direction, respectively) in the sub-scanning direction with respect to the normal of the second reflection surface 52. In other words, the light beams emitted from the light source units 1C and 1D obliquely enter symmetrically in the vertical direction with respect to a reference plane that passes through the center of the second reflection surface 52, which serves as a second deflection surface, in the sub-scanning direction and is parallel to the main scanning cross-section.

An aperture stop 41 includes four openings, each corresponding to one of the light source units. Note that, in this embodiment, the light beams emitted from the light source units are converted by the coupling lenses 2A, 2B, 2C, and 2D into roughly parallel light beams. However, the light beams emitted from the light source units may be converted into divergent light beams having reduced light beam divergence or convergent light beams. Further, the configuration of the coupling lens and the cylindrical lens is not limited to employing two optical elements, and a single anamorphic optical element may also be employed, which has a different power in the main scanning direction from that in the sub-scanning direction.

As illustrated in FIG. 1, a light beam RA reflected and deflected by the first reflection surface 51 is guided to and formed as a spot of light on a photosensitive drum 8A acting as a scanned surface by a first imaging lens 61, which is a first imaging lens, and an imaging lens 7A via the reflection mirror M1. The first imaging lens 61 and the imaging lens 7A, which are plastic molded lenses, and the reflection mirror M1 form a first imaging optical system. When the rotating polygon mirror 5 is rotated in the direction of the arrow by a motor (not shown), the spot of light scans the photosensitive drum 8A in the direction 7a (main scanning direction) to form an electrostatic latent image.

Similarly, a light beam RB reflected and deflected by the first reflection surface 51 is, while being reflected along an optical path by the reflection mirrors M2 and M3, formed as a spot of light on a photosensitive drum 8B by the first imaging lens 61 and an imaging lens 7B. The first imaging lens 61 and the imaging lens 7B, which are plastic molded lenses, and the reflection mirrors M2 and M3 form a second imaging optical system.

A light beam RC reflected and deflected by the second reflection surface 52 is, while being reflected along an optical path by the reflection mirrors M'2 and M'3, guided to and formed as a spot of light on a photosensitive drum 8C by a second imaging lens 62, which is a second imaging lens, and an imaging lens 7C. The second imaging lens 62 and the imaging lens 7C, which are plastic molded lenses, and the reflection mirrors M'2 and M'3 form a third imaging optical system. When the rotating polygon mirror 5 is rotated in the direction of the arrow by the motor (not shown), the spot of light scans the photosensitive drum 8C in the direction 7b to form an electrostatic latent image.

Similarly, a light beam RD reflected and deflected by the second reflection surface 52 is guided to and formed as a spot of light on a photosensitive drum 8D by the second imaging lens 62 and an imaging lens 7D via the reflection mirror M'1. The second imaging lens 62 and the imaging lens 7D, which are plastic molded lenses, and the reflection mirror M'1 form a fourth imaging optical system.

Thus, the light scanning apparatus, which is capable of being used in a tandem-type color image forming apparatus, is configured to form an electrostatic latent image corresponding to one of four different colors (yellow, magenta, cyan, or black) on each of the four photosensitive drums 8A, 8B, 8C, and 8D.

The first imaging lens 61 and the second imaging lens 62, which are used in common by the two light beams RA and RB and by the two light beams RC and RD, are symmetrically arranged about the rotating polygon mirror 5. Regarding the imaging lenses individually arranged on each optical path, the imaging lens 7B is an imaging lens that is arranged in an inverted manner to the imaging lens 7A in the sub-scanning direction, and has the same shape as the imaging lens 7A. Similarly, the imaging lens 7D is arranged in an inverted manner to the imaging lens 7C in the sub-scanning direction.

Figure 3:
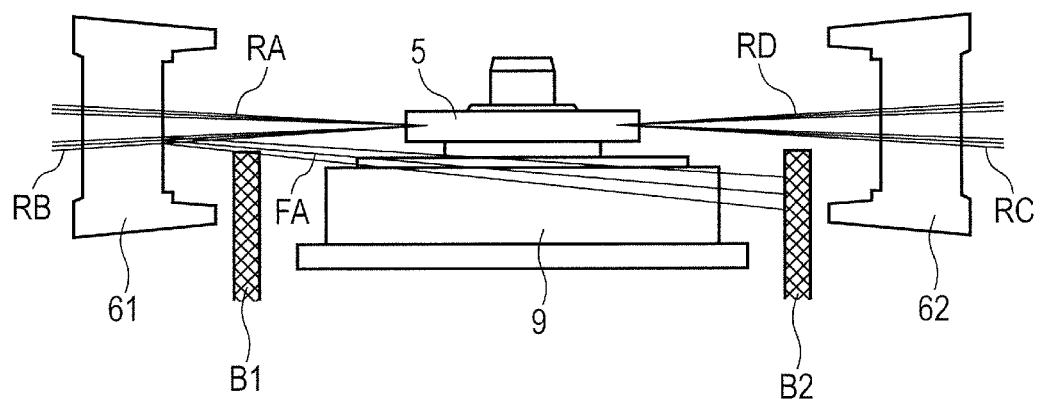
FIG. 3 is an explanatory diagram of a counter flare in the light scanning apparatus according to the first embodiment.

In a light scanning apparatus such as that described in this embodiment, in which imaging lenses are arranged across the rotating polygon mirror 5 and a plurality of photosensitive drums are scanned using different reflection surfaces (the first reflection surface and the second reflection surface 52) of the same rotating polygon mirror 5, flare light, which is stray light, is a problem. In other words, a flare light FA reflected by the optical surface of one of the imaging lenses (the first imaging lens 61) directly enters another imaging lens (the second imaging lens 62) (counter flare). As a result, the flare light FA, which is not intended to be scanned, reaches the photosensitive drum, causing an image defect. As illustrated in FIG. 3, because this counter flare travels away from the light beam RC, the counter flare can be shielded (blocked) comparatively easily by a second shielding member B2.

Figure 8:
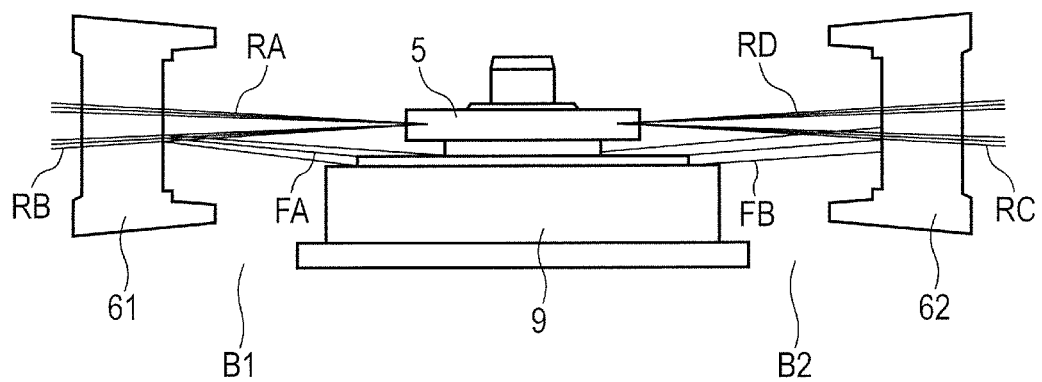
FIG. 8 is an explanatory diagram of a rotor reflection flare according to the related art.

However, because the rotating polygon mirror 5, the first imaging lens 61, and the second imaging lens 62 are arranged close together due to a reduction in the size of the light scanning apparatus, new flare light other than the counter flare is produced. In other words, the flare light FA reflected (scattered) by the optical surface of the first imaging lens 61 is again reflected by the top surface (the upper surface facing the rotating polygon mirror 5) of a rotor 9 forming a part of the motor rotatably holding the rotating polygon mirror 5, thereby turning into a flare light FB (a rotor reflection flare). As illustrated in FIG. 8, the optical path of the rotor reflection flare changes as a result of being reflected by the top surface of the rotor 9, and the flare light FB travels closer to the light beam RC. Consequently, hitherto it has been difficult to shield such a rotor reflection flare.

In other words, in order to shield the flare light FA with a first shielding member B1 arranged on the first imaging lens 61 side, the first shielding member B1 needs to be brought close to the light beam RB. If the optical path of the light beam RB changes downward due to an assembly error or the like, the light beam RB may be shielded. Similarly, in order to shield the flare light FB with the second shielding member B2, the second shielding member B2 needs to be brought close to the light beam RC. If the optical path of the light beam RC changes downward due to an assembly error or the like, the light beam RC may be shielded.

Figure 4:
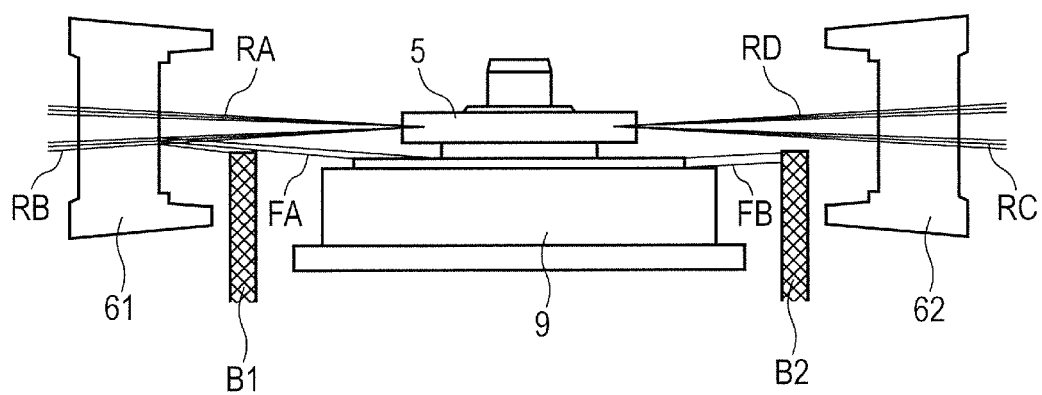
FIG. 4 is an explanatory diagram of a rotor reflection flare in the light scanning apparatus according to the first embodiment.

Therefore, in this embodiment, as illustrated in FIG. 4, regarding the rotating polygon mirror 5, a part of the flare light FA is shielded by the first shielding member B1 arranged in the optical path on the same side as the side on which the first imaging lens 61 is arranged. Further, a part or all of the flare light FB inverted in the sub-scanning direction, which has passed by the first shielding member B1 and been reflected by the top surface of the rotor 9, is shielded by the second shielding member B2 arranged in the optical path on the same side as the side on which the second imaging lens 62 is arranged.

In this embodiment, a gap between the first shielding member B1 and the light beam FB can be more sufficiently secured compared with when the flare light FA is shielded by the first shielding member B1. As a result, there is no possibility of the light beam RB being shielded even if the optical path of the light beam RB changes due to an assembly error or the like. On the other hand, although the side including the lower marginal light rays of the flare light FA can be shielded, the side including the upper marginal light rays cannot be shielded. Those marginal light rays are reflected by the top surface of the rotor 9 and turn into a rotor reflection flare FB.

However, the upper marginal light rays of the flare light FA are reflected by the top surface of the rotor 9, thereby being vertically inverted, and hence in the flare light FB, those upper marginal light rays turn into lower marginal light rays. The lower marginal light ray side of the flare light FA corresponding to the upper marginal light ray side of the flare light FB is shielded by the first shielding member B1. Therefore, when shielding the flare light FB with the second shielding member B2, the flare light FB can be shielded without bringing the second shielding member B2 closer to the light beam RC. As a result, there is no possibility of the light beam RC being shielded even if the optical path of the light beam RC changes due to an assembly error or the like.

The configuration of the first shielding member B1 and the second shielding member B2 is now described in more detail with reference to FIGS. 5A and 5B. The first shielding member B1 and the second shielding member B2 have the same shape in the sub-scanning cross-section, and extend in the main scanning direction. Note that, in FIG. 5A, the origin is the intersection (point O in FIG. 5B) between the plane, which includes a deflection point P1 of the light beam RB at the first reflection surface 51 and is perpendicular to the axis of rotation of the rotating polygon mirror 5, and the axis of rotation of the rotating polygon mirror 5, and X and Y axes are defined as shown in FIG. 5A.

Figure 5A:
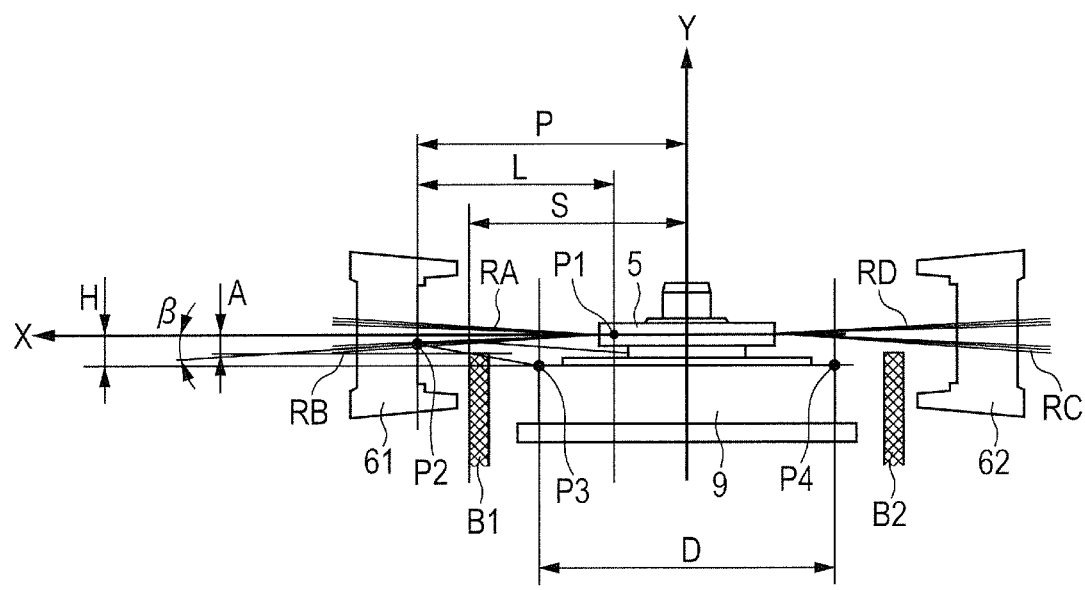
FIG. 5A is an expanded diagram for illustrating the main parts of the light scanning apparatus according to the first embodiment.
Figure 5B:
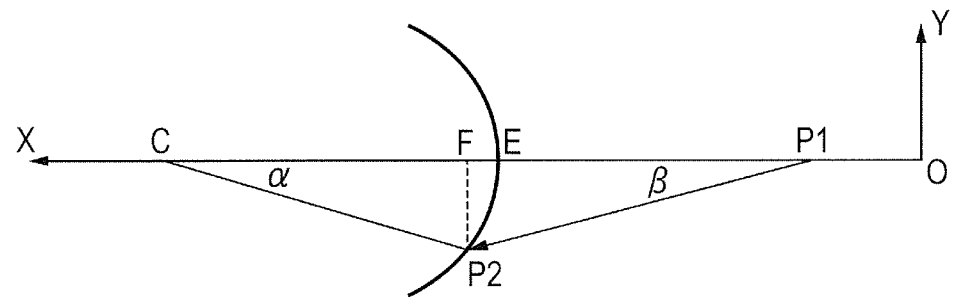
FIG. 5B is an explanatory diagram relating to derivation of a conditional expression.

In this case, in FIG. 5A, when the distance from the deflection point P1 to the first imaging lens 61 (the length between the deflection point P1 and a point E in FIG. 5B) is L, the distance from the axis of rotation of the rotating polygon mirror 5 to the first imaging lens 61 (the length between the point O and the point E in FIG. 5B) is P, the angle of incidence of the principal ray of the light beam RB with respect to the first reflection surface 51 in the sub-scanning cross-section is $\beta$, the curvature radius of the optical surface of the first imaging lens 61 in the sub-scanning direction (the length between a center of curvature C and a point P2 in FIG. 5B) is r, an angle between the direction connecting the center of curvature C with the point P2 and the direction connecting the center of curvature C with the point O is $\alpha$, the foot of the perpendicular from the point P2 is F, and the length between the point E and a point F is $\Delta x$, the following expression holds.

$$\Delta x = r - r \times \cos\alpha$$

Further, the length between the point P2 and the point F can be expressed as $r \times \sin\alpha = (L+\Delta x) \times \tan\beta$. Based on these two equalities, the x coordinate and the y coordinate of the point P2 can be expressed as follows without using $\alpha$ or $\Delta x$.

$$P2: \left( P + \frac{r - L\tan^2\beta - \sqrt{r^2 - 2rL\tan^2\beta - L^2\tan^2\beta}}{1 + \tan^2\beta}, \right.$$
$$\left. \frac{-\tan\beta}{1+\tan^2\beta}\left(r + L - \sqrt{r^2 - 2rL\tan^2\beta - L^2\tan^2\beta}\right) \right)$$

In this case, when $\beta$ is too small, it is difficult to separate the light rays. On the other hand, when $\beta$ is too large, it is difficult to correct for aberration. Consequently, β is usually around 2 to 6 degrees, and hence tan β is smaller than r and L. As a result, the following approximation holds.

$$\sqrt{r^2 - 2rL\tan^2\beta - L^2\tan\beta} \cong r\left(1 - \frac{L^2 + 2rL}{2r^2}\tan^2\beta\right)$$

Therefore, the x coordinate and the y coordinate of the point P2 can be approximated as follows.

$$P2: \left(P + \frac{L^2}{2r}\sin^2\beta, -L\tan\beta\left(1 + \frac{L}{2r}\sin^2\beta\right)\right)$$

In this case, the upper edge of the first shielding member B1 (the edge portion thereof on the side closer to the top surface of the rotor 9 in the sub-scanning direction) is positioned so as to be present in a region enclosed by the point P2, an edge point P3 of the rotor 9 on the first imaging lens 61 side, and an edge point P4 of the rotor 9 on the second imaging lens 62 side. In other words, if the upper edge of the first shielding member B1 is above the straight line connecting the point P2 and the point P4, when the optical path of the light beam RB has changed due to an assembly error or the like, the light beam RB may be shielded by the first shielding member B1. Therefore, the upper edge of the first shielding member B1 is positioned so as to be below the straight line connecting the point P2 and the point P4.

Further, when the upper edge of the first shielding member B1 is below the straight line connecting the point P2 and the point P3, the flare light prior to reflection by the rotor 9 cannot be shielded, and hence the rotor reflection flare cannot be shielded unless the upper edge of the second shielding member B2 is brought close to the light beam RC. In this case, when the optical path of the light beam RC changes downward due to an assembly error or the like, the light beam RC may be shielded by the second shielding member B2. Therefore, the upper edge of the first shielding member B1 is positioned so as to be above the straight line connecting the point P2 and the point P3.

In this case, the first imaging lens 61 only needs to be configured such that, when the distance from the plane that includes the deflection point P1 and is perpendicular to the axis of rotation of the rotating polygon mirror 5 to the top surface of the rotor 9 is H, the distance from the axis of rotation of the rotating polygon mirror 5 to the first shielding member B1 is S, the diameter of the top surface of the rotor 9 is D, and the distance from the plane that includes the deflection point P1 and is perpendicular to the axis of rotation of the rotating polygon mirror 5 to the upper edge of the first shielding member 61 is A, the following expression is satisfied.

$$H - \frac{\{H - L\tan\beta(1 + \frac{L}{2r}\sin^2\beta)\}(S + \frac{D}{2})}{P + \frac{D}{2} + \frac{L^2}{2r}\sin^2\beta} < \quad (1)$$

$$A < H - \frac{\{H - L\tan\beta(1 + \frac{L}{2r}\sin^2\beta)\}(S - \frac{D}{2})}{P - \frac{D}{2} + \frac{L^2}{2r}\sin^2\beta}$$

The second shielding member B2 also only needs to be configured so as to satisfy the same condition for each of the values of the second shielding member side. Note that, when there is a step on the top surface of the rotor 9, the value at the outermost periphery (the position at the distance of D/2 from the center of the top surface of the rotor 9) is used for the distance H from the plane that includes the deflection point P1 and is perpendicular to the axis of rotation of the rotating polygon mirror 5 to the top surface of the rotor 9.

Normally, the absolute value of r is about the same as L or is larger than L. Further, because β is several degrees, sin β is sufficiently smaller than the absolute value of r and L. In consideration of those points, it is sufficient to satisfy the following approximate conditional expression.

$$H - \frac{(H - L\tan\beta)(S + \frac{D}{2})}{P + \frac{D}{2}} < A < H - \frac{(H - L\tan\beta)(S - \frac{D}{2})}{P - \frac{D}{2}} \quad (2)$$

Satisfying the approximate conditional expression (2) allows only the flare light to be shielded without shielding the actual light beam, even when there is an assembly error or the like. As a result, image defects caused by flare light can be prevented.

In this case, satisfying the approximate conditional expression (2) allows the flare light to be shielded to a level of light at which there is no effect on the printed image. However, it may not be possible to completely shield the flare light. An example of such a case is when the first shielding member B1 and the second shielding member B2 are both close to the upper limit of the approximate conditional expression (2). In this case, when a rotor reflection flare occurs due to reflection by the top surface of the rotor 9 near the point P4, only a part of the flare light may be shielded by both the first shielding member B1 and the second shielding member B2, and the remaining flare light may reach the photosensitive drum.

Because the flare light is shielded to a level of light at which there is no effect on the printed image, there is no problem in actual practice. However, when it is desired to further increase the shielding effect, the following configuration may be employed. Specifically, the height of the upper edge of the first shielding member B1 is set so as to be above the midpoint of the height of the straight line connecting the point P2 and the point P3 at the position of the first shielding member B1 and the height of the straight line connecting the point P2 and the point P4 at the position of the first shielding member B1. More specifically, a configuration satisfying the following conditional expression may be employed.

$$H - \frac{\{H - L\tan\beta(1 + \frac{L}{2r}\sin^2\beta)\}(S + \frac{D}{2})}{P + \frac{D}{2} + \frac{L^2}{2r}\sin^2\beta} < A \leq \quad (3)$$

$$H - \frac{\{H - L\tan\beta(1 + \frac{L}{2r}\sin^2\beta)\}\{S(P + \frac{L^2}{2r}\sin^2\beta) - \frac{D^2}{4}\}}{(P + \frac{D}{2} + \frac{L^2}{2r}\sin^2\beta)(P - \frac{D}{2} + \frac{L^2}{2r}\sin^2\beta)}$$

Note that, more simply, it is sufficient to satisfy the following conditional expression.

$$H - \frac{(H - L\tan\beta)\left(S + \frac{D}{2}\right)}{P + \frac{D}{2}} < A < H - \frac{(H - L\tan\beta)\left(PS - \frac{D^2}{4}\right)}{\left(P + \frac{D}{2}\right)\left(P - \frac{D}{2}\right)} \quad (4)$$

In this embodiment, H=3.25 [mm], L=16 [mm], P=21.593 [mm], S=17.4 [mm], D=23.8 [mm], r=−1,000 [mm], and β=3 [deg]. Further, the left side of Expression (1) equals 1.140 [mm], and the right side of Expression (1) equals 1.882 [mm]. In addition, both of the values of the left side and the right side of Expression (2) are the same as in Expression (1) because the absolute value of the curvature radius of the first imaging lens 61 in the sub-scanning direction is large.

Therefore, in this embodiment, a configuration is employed so as to satisfy Expression (2) by setting A to 1.5 [mm]. As a result, even when there is an assembly error or the like, only the flare light can be shielded without shielding the actual light beam. Note that, the right side of Expression (3) equals 1.511 [mm], and the right side of Expression (4) is the same value. In this embodiment, the shielding effect of the flare light is further increased by satisfying Expression (4).

When the first shielding member B1 is too close to the drive substrate of the motor (not shown), which is a heat source, configured to rotate the rotating polygon mirror 5, the first shielding member B1 is susceptible to the effects of thermal deformation of the housing. Due to deformation of the housing, the first shielding member B1 may be displaced, for example, by leaning in the sub-scanning direction, or the first shielding member B1 may itself be deformed, which cannot prevent the flare light from being shielded, resulting in an image defect. Therefore, it is desired that the first shielding member B1 be arranged so as to satisfy the following conditional expression.

$$0.5 \leq S/P \leq 0.95 \quad (5)$$

Configuring the first shielding member B1 in this manner allows a gap to be obtained from the motor drive substrate, which is a heat source, and as a result, the first shielding member B1 is less susceptible to the effects of thermal deformation of the housing. The same also applies for the second shielding member B2. In this embodiment, because S=17.4 [mm] and P=21.593 [mm], S/P=0.806, and hence Expression (5) is satisfied.

Further, in this embodiment, the first shielding member B1 and the second shielding member B2 are formed integrally with a housing containing at least a rotating polygon mirror, which is a deflection element. In such a case, because the first shielding member B1 and the second shielding member B2 are particularly susceptible to the effects of thermal deformation of the housing, it is desired that the first shielding member B1 and the second shielding member B2 be configured such that Expression (5) is satisfied.

Note that, in the imaging optical systems described above, the light beams enter the deflection surface in a downward direction in the sub-scanning direction. However, in imaging optical systems in which the light beams enter the deflection surface in an upward direction in the sub-scanning direction, the above-mentioned configuration is not necessary because reflection corresponding to the reflection by the top surface of the rotor does not occur.

In this embodiment, the first imaging lens 61 and the second imaging lens 62 are symmetrically arranged about the rotating polygon mirror 5 so as to face each other. The height of the upper edge of the first shielding member B1 and the height of the upper edge of the second shielding member B2, which are also arranged symmetrically to each other, are set to be within an appropriate range. As a result, even when there is an assembly error or the like, only the flare light can be shielded without shielding the actual light beam.

Second Embodiment

Figure 6:
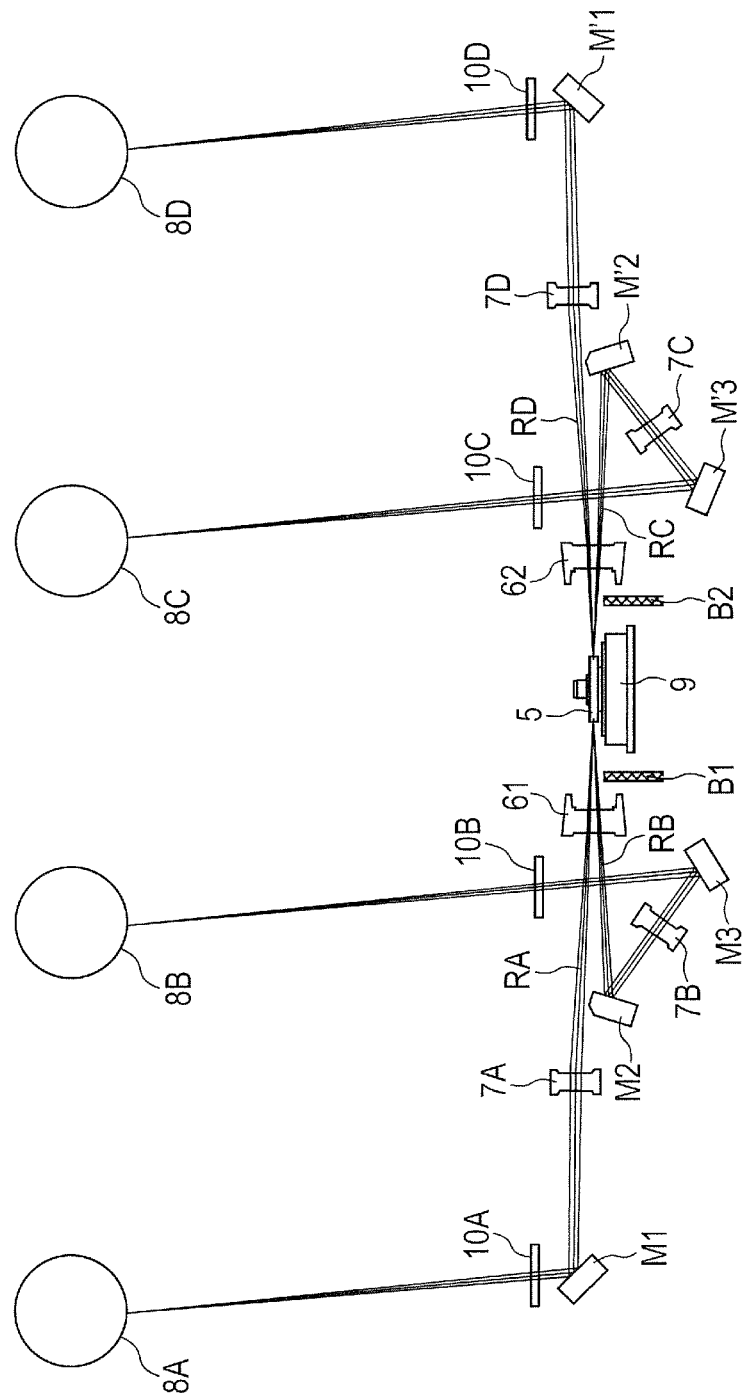
FIG. 6 is a sub-scanning cross-sectional view of a light scanning apparatus according to a second embodiment of the present invention.

FIG. 6 is a cross-sectional view of the main parts in a sub-scanning direction (sub-scanning cross-sectional view) of a light scanning apparatus according to a second embodiment of the present invention. Parts that are the same as in the first embodiment are denoted by the same reference symbols. The light scanning apparatus according to this embodiment includes anti-dust glass members 10A, 10B, 10C, and 10D, which are for preventing the entry of toner, dust, and the like from outside. In this embodiment, the arrangement of the various optical components is different from the first embodiment, but the basic optical action is the same as in the first embodiment. Further, in this embodiment, the side on which the rotor reflection flare occurs is the light beam RB and light beam RC side.

In this embodiment, H=2.5 [mm], L=20 [mm], P=25.579 [mm], S=17.58 [mm], D=23.8 [mm], r=25 [mm], and 3=3 [deg]. The left side of Expression (1) equals 1.360 [mm], and the right side of Expression (1) equals 1.899 [mm]. The left side of Expression (2) equals 1.358 [mm], and the right side of Expression (2) equals 1.897 [mm].

Unlike the first embodiment, the absolute value of the curvature radius r of the first imaging lens 61 in the sub-scanning direction is small, but the difference between Expression (1) and Expression (2) is 0.002 [mm]. It can thus be seen that even in such a case, it is sufficient to employ a configuration that satisfies Expression (2). In this embodiment, Expression (2) is satisfied by setting A to 1.6 [mm]. Therefore, even when there is an assembly error or the like, only the flare light can be shielded without shielding the actual light beam.

Further, the right side of Expression (3) equals 1.629 [mm], and the right side of Expression (4) equals 1.628 [mm]. The difference is 0.001 [mm], and it can thus be seen that it is sufficient to employ a configuration that satisfies Expression (4). In this embodiment, the shielding effect of the flare light can be further increased by satisfying Expression (4).

In addition, S/P=0.687, and hence susceptibility to the effects of thermal deformation of the housing can be reduced by satisfying Expression (5).

Third Embodiment

Figure 7:
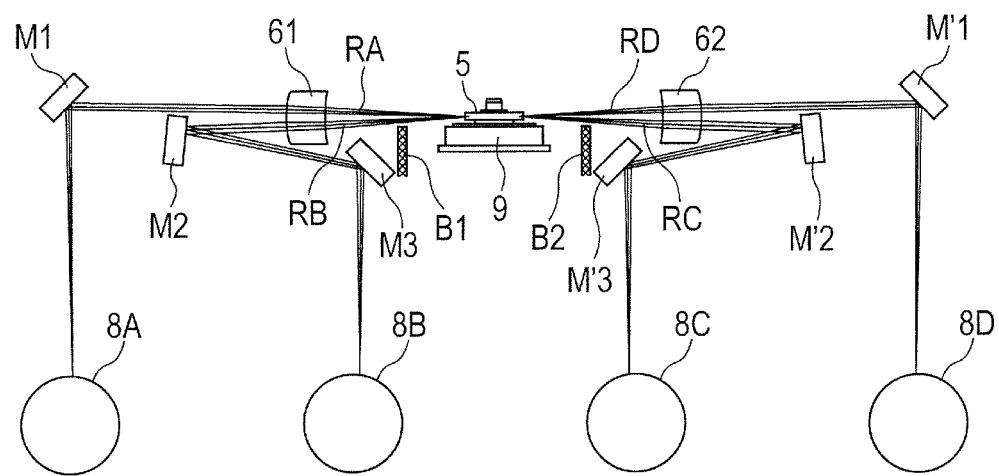
FIG. 7 is a sub-scanning cross-sectional view of a light scanning apparatus according to a third embodiment of the present invention.

FIG. 7 is a cross-sectional view of the main parts in a sub-scanning direction (sub-scanning cross-sectional view) of a light scanning apparatus according to a third embodiment of the present invention. Parts that are the same as in the first embodiment are denoted by the same reference symbols. In this embodiment, there are no imaging lenses individually arranged for each of the optical paths, and there are only the first imaging lens 61 and the second imaging lens 62. The first imaging lens 61 and the second imaging lens 62 are formed as a multistage lens in which different optical surfaces are vertically coupled in an integral manner.

In this embodiment, H=2.5 [mm], L=28.218 [mm], P=33.995 [mm], S=18 [mm], D=23.8 [mm], r=−12.394 [mm], and β=3 [deg]. In this case, the side on which the rotor reflection flare occurs is the light beam RB and light beam RC side. Therefore, the curvature radius of the light beam RB and light beam RC side is used for the curvature radius r of the first imaging lens 61 and the second imaging lens 62 in the sub-scanning direction.

The left side of Expression (1) equals 1.830 [mm], and the right side of Expression (1) equals 2.216 [mm]. The left side of Expression (2) equals 1.835 [mm], and the right side of Expression (2) equals 2.218 [mm]. The difference between Expression (1) and Expression (2) is 0.005 [mm] at most. It can thus be seen that it is sufficient to employ a configuration that satisfies Expression (2). In this embodiment, Expression (2) is satisfied by setting A to 1.95 [mm]. Therefore, even when there is an assembly error or the like, only the flare light can be shielded without shielding the actual light beam.

The right side of Expression (3) equals 2.023 [mm], and the right side of Expression (4) equals 2.026 [mm]. The difference is 0.003 [mm], and it can thus be seen that it is sufficient to employ a configuration that satisfies Expression (4). In this embodiment, the shielding effect of the flare light can be further increased by satisfying Expression (4).

In addition, S/P=0.529, and hence susceptibility to the effects of thermal deformation of the housing can be reduced by satisfying Expression (5).

MODIFIED EXAMPLES

The exemplary embodiments of the present invention are described above, but the present invention is not limited to these embodiments and can be modified and changed variously within the scope of the gist thereof.

Modified Example 1

In the embodiments described above, a configuration is described in which four photosensitive drums are scanned by a single rotating polygon mirror. However, a configuration in which two or three photosensitive drums are scanned may also be employed, as long as the first imaging lens and the second imaging lens are arranged on opposite sides across the rotating polygon mirror.

Modified Example 2

Further, it is not always necessary for the first imaging lens and the second imaging lens to be symmetrical, as long as the first imaging lens and the second imaging lens face each other across the rotating polygon mirror. When the first imaging lens and the second imaging lens are not symmetrical, the first shielding member and the second shielding member may be configured so as to satisfy Expression (2) and Expression (4) by using the respective values of the first imaging lens side and the second imaging lens side.

Modified Example 3

In addition, a semiconductor laser, a monolithic multilaser having a plurality of luminous points, and the like may be used as the light source unit.

According to the present invention, a light scanning apparatus that is compact and is capable of suppressing the effects of flare light on an image without increasing costs when attempting to optimize each light scanning apparatus, and an image forming apparatus using such a light scanning apparatus can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-220164, filed Oct. 29, 2014, which is hereby incorporated by reference herein in its entirety.

What is claimed is:

1. A light scanning apparatus, comprising:
a deflection element including a first deflection surface for deflecting a light beam from a first light source and a second deflection surface for deflecting a light beam from a second light source;
a rotor including a top surface facing the deflection element, the rotor being configured to rotatably hold the deflection element;
a first imaging optical system including a first imaging lens, the first imaging optical system being configured to guide a light beam from the first deflection surface to a first scanned surface;
a second imaging optical system including a second imaging lens arranged to face the first imaging lens so as to sandwich the deflection element, the second imaging optical system being configured to guide a light beam from the second deflection surface to a second scanned surface;
a first shielding member arranged in an optical path of the first imaging optical system; and
a second shielding member arranged in an optical path of the second imaging optical system,
wherein the following conditional expression is satisfied:

$$H - \frac{(H - L\tan\beta)\left(S + \frac{D}{2}\right)}{P + \frac{D}{2}} < A < H - \frac{(H - L\tan\beta)\left(S - \frac{D}{2}\right)}{P - \frac{D}{2}}$$

where A represents a distance from a reference plane to an edge portion of the first shielding member in a sub-scanning direction on a side closer to the top surface, the reference plane including a center of the first deflection surface in the sub-scanning direction and being parallel to a main scanning cross-section, H represents a distance from the reference plane to the top surface, L represents a distance from a deflection point of the light beam at the first deflection surface to the first imaging lens, P represents a distance from an axis of rotation of the deflection element to the first imaging lens, S represents a distance from the axis of rotation to the first shielding member, D represents a diameter of the top surface, and p represents an angle of incidence of the light beam from the first light source with respect to the first deflection surface in a sub-scanning cross-section.

2. A light scanning apparatus according to claim 1,
wherein the first shielding member is arranged in an optical path between the deflection element and the first imaging lens, and
wherein the second shielding member is arranged in an optical path between the deflection element and the second imaging lens.

3. A light scanning apparatus according to claim 1, wherein a condition represented by $$2 \leq \beta \leq 6$$

is satisfied.

4. A light scanning apparatus according to claim 1, wherein the first imaging lens comprises a plastic molded lens.

5. A light scanning apparatus according to claim 1, wherein a condition represented by 0.5≤S/P≤0.95 is satisfied.

6. A light scanning apparatus according to claim 1, wherein a condition represented by $$H - \frac{(H - L\tan\beta)\left(S + \frac{D}{2}\right)}{P + \frac{D}{2}} < A < H - \frac{(H - L\tan\beta)\left(PS - \frac{D^2}{4}\right)}{\left(P + \frac{D}{2}\right)\left(P - \frac{D}{2}\right)}$$

is satisfied.

7. A light scanning apparatus according to claim 1, wherein the first shielding member and the second shielding member are formed integrally with a housing for containing at least the deflection element.

8. A light scanning apparatus according to claim 1,
wherein the first shielding member is configured to block light reflected by the first imaging lens, and
wherein the second shielding member is configured to block light that has passed by the first shielding member and been reflected by the top surface.

9. A light scanning apparatus, comprising:
a deflection element including a first deflection surface for deflecting a light beam from a first light source and a second deflection surface for deflecting a light beam from a second light source;
a rotor including a top surface facing the deflection element, the rotor being configured to rotatably hold the deflection element;
a first imaging optical system including a first imaging lens, the first imaging optical system being configured to guide a light beam from the first deflection surface to a first scanned surface;
a second imaging optical system including a second imaging lens arranged to face the first imaging lens so as to sandwich the deflection element, the second imaging optical system being configured to guide a light beam from the second deflection surface to a second scanned surface;
a first shielding member arranged in an optical path of the first imaging optical system; and
a second shielding member arranged in an optical path of the second imaging optical system,
wherein the first shielding member is arranged at a position at which an edge portion of the first shielding member on a side closer to the top surface in a sub-scanning direction blocks light reflected by the first imaging lens, and
wherein the second shielding member is arranged at a position at which an edge portion of the second shielding member on a side closer to the top surface in the sub-scanning direction blocks light that has passed by the first shielding member and been reflected by the top surface.

10. A light scanning apparatus according to claim 9,
wherein the first shielding member is arranged in an optical path between the deflection element and the first imaging lens, and
wherein the second shielding member is arranged in an optical path between the deflection element and the second imaging lens.

11. An image forming apparatus, comprising:
a light scanning apparatus comprising:
a deflection element including a first deflection surface for deflecting a light beam from a first light source and a second deflection surface for deflecting a light beam from a second light source;
a rotor including a top surface facing the deflection element, the rotor being configured to rotatably hold the deflection element;
a first imaging optical system including a first imaging lens, the first imaging optical system being configured to guide a light beam from the first deflection surface to a first scanned surface;
a second imaging optical system including a second imaging lens arranged to face the first imaging lens so as to sandwich the deflection element, the second imaging optical system being configured to guide a light beam from the second deflection surface to a second scanned surface;
a first shielding member arranged in an optical path of the first imaging optical system; and
a second shielding member arranged in an optical path of the second imaging optical system,
wherein the following conditional expression is satisfied:

$$H - \frac{(H - L\tan\beta)\left(S + \frac{D}{2}\right)}{P + \frac{D}{2}} < A < H - \frac{(H - L\tan\beta)\left(S - \frac{D}{2}\right)}{P - \frac{D}{2}}$$

where A represents a distance from a reference plane to an edge portion of the first shielding member in a sub-scanning direction on a side closer to the top surface, the reference plane including a center of the first deflection surface in the sub-scanning direction and being parallel to a main scanning cross-section, H represents a distance from the reference plane to the top surface, L represents a distance from a deflection point of the light beam at the first deflection surface to the first imaging lens, P represents a distance from an axis of rotation of the deflection element to the first imaging lens, S represents a distance from the axis of rotation to the first shielding member, D represents a diameter of the top surface, and p represents an angle of incidence of the light beam from the first light source with respect to the first deflection surface in a sub-scanning cross-section;
a developing unit configured to develop as a toner image an electrostatic latent image formed on a photosensitive body with a light beam scanned by the light scanning apparatus;
a transferring unit configured to transfer the toner image on a transfer material; and
a fixing unit configured to fix the transferred toner image onto the transfer material.

12. An image forming apparatus according to claim 11, further comprising a printer controller configured to convert code data input from an external apparatus into an image signal, and input the converted image signal to the light scanning apparatus.

* * * * *